G. W. Payne.
Cotton Gin.
No. 106,613.          Patented Aug. 23, 1870.
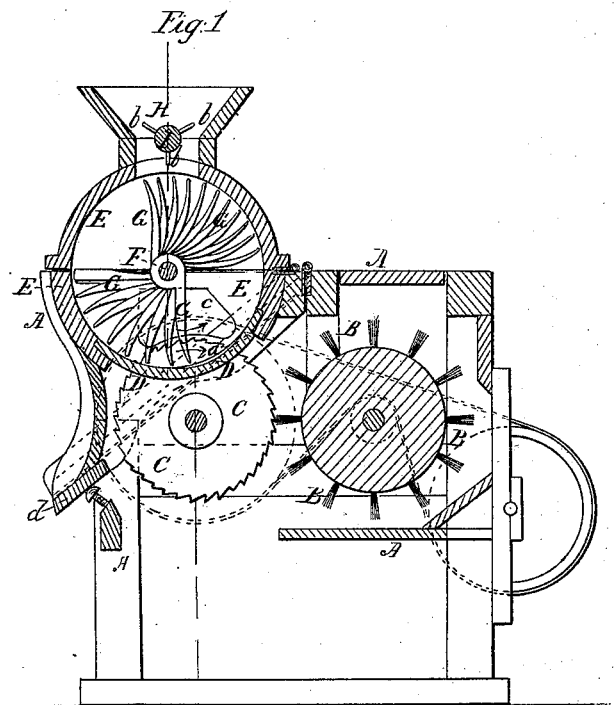
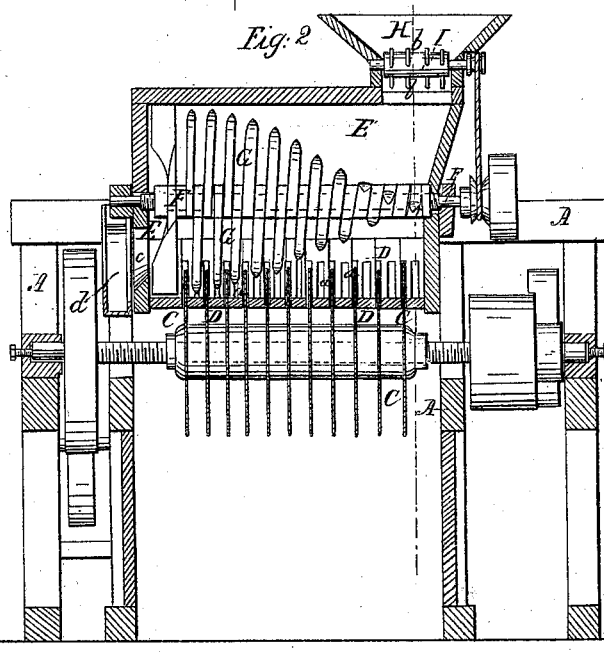
Witnesses:
A. Bennewiendorf
W. H. Clark
Inventor:
G. W. Payne
per Munn & Co
Attorneys

United States Patent Office.

GEORGE W. PAYNE, OF MEMPHIS, TENNESSEE.

Letters Patent No. 106,613, dated August 23, 1870.

IMPROVEMENT IN GIN FOR LINTING COTTON.

The Schedule referred to in these Letters Patent and making part of the same

*To all whom it may concern:*

Be it known that I, GEORGE W. PAYNE, of Memphis, county of Shelby and State of Tennessee, have invented a new and improved Gin for Linting Cotton; and I do hereby declare the following to be full, clear, and exact description thereof, which will enable those skilled in the art to make and use the same, reference being had to the accompanying drawing forming part of this specification.

Figure 1 represents a vertical transverse section of my improved gin for linting cotton.

Figure 2 is a vertical longitudinal section of the same.

Similar letters of reference indicate corresponding parts.

This invention relates to a new arrangement of machinery for removing the short lint from cotton-seed that has already been ginned, and also for ginning cotton-seed as it comes from the field. For reginning cotton-seed after it has been ginned on ordinary gins this machine is of great advantage, as it is calculated to take about fifty pounds of short lint from every ton of seed.

For ginning cotton from the field it is better than ordinary gins, as it operates quicker, and as it cleans the seed entirely of all lint.

For the latter function, the construction of the machine must be slightly modified.

The invention consists, first, in the application of a revolving screw reel, which is used to feed the cotton to the saws, and to continue to hold it against the saws, and to feed it through the cotton-box until the lint has been entirely removed.

The invention consists, also, in the arrangement of grooved ribs between the saws, for the purpose of retaining the seed, while the lint is allowed to pass.

The invention finally consists in the use of a hopper and agitator at one end of the reel-box, and of a discharge-aperture at the other end.

A in the drawing is the frame of the machine. It contains the gin-brushes B, and the common gin-saws C, in a manner similar to the ordinary gins, with the exception that the saws are set closer together.

The saws are fitted between ribs, D D, which form the bottom of a cylindrical box, E, the said box being provided with a hinged cover, as shown.

Concentrically within the box is arranged a horizontal shaft, F, which has its bearings in the ends of the box, and which carries a series of projecting curved ribs or fingers, G G. Of these ribs or fingers G there are about two or more to every saw, and they are all set separately around the shaft, as shown, to form screws, of the entire length of the box.

The ribs G are of sufficient length to agitate all the seed and cotton that may be contained in the box E, and no seed is, therefore, allowed to remain out of motion.

The shaft F revolves in opposite direction to the saws, whereby the lower ends of the fingers G and the upper ends of the saws are carried in the same direction, as indicated by arrows in fig. 1.

The fingers, however, pass much slower than the saws, thereby detaining the seed and cotton, and forming a cutting or grinding-point all along that part of the saw where the revolving rib or arm passes, until it reaches the place where the saw carries the lint through between the grates or ribs D.

At that point the said grates or ribs D are grooved, as indicated at $a$ in fig. 1, so that they have prominent edges.

The operation is thereby considerably facilitated, as the seed and cotton have a tendency to fall into the said grooves, so as to keep all spaces between the grates free, for the lint to pass through.

The saws are thereby enabled to carry the lint through the said spaces in a loose state, and the brushes are enabled to equalize it, and to free it from all small impurities.

Upon one end of the box E is placed a hopper, H, which contains a shaft, I, as shown.

From the said shaft project arms, $b\ b$, which, as they are revolved, prevent the seed fed into the hopper from becoming clogged while passing into the cylinder E.

The screw formed by the fingers G causes the cotton and seed to be fed to the discharge-end of the box, where there is an aperture, $c$, through which the seed may escape into a discharge-spout. While passing longitudinally through the box, every portion of cotton and every seed is exposed to the action of every saw, and the seed is thereby entirely free from all lint.

In order to gin seed-cotton from the field, I arrange the first fifty, more or less, saws in the ordinary manner, commencing from the feed-end. They will take off the long lint.

The remaining saws are put close together, say half an inch apart, and a partition is arranged in the lint-room for keeping the short lint separate from the long.

This machine will be simpler and cheaper, and more effective than the ordinary gins now in use.

Having thus described my invention,

I claim as new and desire to secure by Letters Patent—

1. The reel, consisting of the fingers G, projecting from the shaft F in spiral rows, in combination the saws C, as and for the purpose herein shown and described.

2. The grate-bars or ribs D, forming the slotted bottom of the box E, substantially as described, and grooved on their concave surfaces, as and for the purposes specified.

3. The hopper H and agitator I $b$, arranged on a cotton-gin for linting cotton, substantially as and for the purpose herein shown and described, and to be used in combination with the screw reel, as set forth.

GEOR. W. PAYNE.

Witnesses:
JAMES HAN, Jr.,
ELDON HIGH.